United States Patent [19]
Kells et al.

[11] Patent Number: 5,764,887
[45] Date of Patent: Jun. 9, 1998

[54] SYSTEM AND METHOD FOR SUPPORTING DISTRIBUTED COMPUTING MECHANISMS IN A LOCAL AREA NETWORK SERVER ENVIRONMENT

[75] Inventors: Timothy Roger Kells, Round Rock; Thomas Frank Peebles, Austin, both of Tex.

[73] Assignee: International Business Machines Corporation, Armonk, N.Y.

[21] Appl. No.: 570,463

[22] Filed: Dec. 11, 1995

[51] Int. Cl.⁶ .................................. G06F 11/00; H04K 1/00
[52] U.S. Cl. ...................... 395/186; 395/187.01; 380/23; 364/222.5; 364/286.5
[58] Field of Search ........................... 395/186, 187.01, 395/188.01; 380/4, 23, 25, 30; 364/222.5, 286.4, 286.5, 260.81

[56] References Cited

U.S. PATENT DOCUMENTS

| | | | |
|---|---|---|---|
| 5,204,961 | 4/1993 | Barlow | 395/187.01 |
| 5,235,642 | 8/1993 | Wobber et al. | 380/25 |
| 5,239,662 | 8/1993 | Danielson et al. | 364/239 |
| 5,245,657 | 9/1993 | Sakurai | 380/25 |
| 5,329,619 | 7/1994 | Page et al. | 395/200.01 |
| 5,369,705 | 11/1994 | Bird et al. | 380/21 |
| 5,414,833 | 5/1995 | Hershey et al. | 395/187.01 |
| 5,428,351 | 6/1995 | Lee, Jr. et al. | 340/870.02 |
| 5,432,932 | 7/1995 | Chen et al. | 395/673 |
| 5,434,562 | 7/1995 | Reardon | 340/825.34 |
| 5,434,918 | 7/1995 | Kung et al. | 380/25 |
| 5,442,342 | 8/1995 | Kung | 340/825.34 |
| 5,463,625 | 10/1995 | Yasrebi | 370/85.13 |
| 5,491,752 | 2/1996 | Kaufman et al. | 380/30 |
| 5,495,533 | 2/1996 | Linehan et al. | 380/21 |
| 5,497,421 | 3/1996 | Kaufman et al. | 380/23 |
| 5,560,008 | 9/1996 | Johnson et al. | 395/680 |

FOREIGN PATENT DOCUMENTS 0 398 492 A2  11/1990  European Pat. Off.

OTHER PUBLICATIONS

"Integrating Security in CORBA Based Object Architectures", Proceedings of the Symposium on Security and Privacy, May, 1995, #1081–6011/95, IEEE, pp. 50–61.

"Personal Computer—Local Area Network Logon", IBM Technical Disclosure Bulletin, vol. 33, No. 10A, Mar. 1991, pp. 279–280.

"Dual–Processor Boot Procedure for LAN Services", IBM Technical Disclosure Bulletin, vol. 35, No. 3, Aug. 1992, pp. 306–316.

"Secure Generic Authentication for Distributed Computing Environment Applications", IBM Technical Disclosure Bulletin, vol. 38, No. 5, May 1995, pp. 521–522.

"Migration Utility for Distributed Computing Environment Application Enabler for OS/2", IBM Technical Disclosure Bulletin, vol. 38, No. 3, Mar. 1995, pp. 473–476.

*Primary Examiner*—Robert W. Beausoliel, Jr.
*Assistant Examiner*—Dieu-Minh Le
*Attorney, Agent, or Firm*—Robert M. Carwell

[57] ABSTRACT

LAN server machines are configured to utilize their existing mechanisms to pass generic security subsystem (GSS) distributed computing environment (DCE) credentials. The server management block (SMB) protocol is extended to facilitate exchange of such credentials wherein the server utilizes the GSS API interface to obtain and validate such credentials. The GSS interface provides tokens which encapsulate all necessary information to perform mutual authentication between the client and server. A new protocol level is defined with respect to such SMB protocol extensions which includes a new protocol name exchanged in the negotiate protocol (NP) SMB. Pre-existing LAN servers will turn on a bit in the SMB_Secmode field in the NP response indicating that the server supports exchange of secpkgX SMB. The server will then wait for an SMB secpkgX or SMB sesssetupX response. The former response will permit the user/client and server to exchange GSS tokens utilizing a conventional LAN server mechanism and to thereby and mutually authenticate.

9 Claims, 5 Drawing Sheets

SYSTEM AND METHOD FOR SUPPORTING DISTRIBUTED COMPUTING MECHANISMS IN A LOCAL AREA NETWORK SERVER ENVIRONMENT

TECHNICAL FIELD

This invention relates to authentication in computer systems and, more particularly, to authentication techniques in client-server local area network environments.

BACKGROUND OF THE INVENTION

In a session setup of a typical local area network, a process transpires conventionally wherein, with reference to FIG. 2, a client-user 100 and a server 102 negotiate a network protocol 104 (NP). During such negotiation, a protocol and associated protocol level 208 are agreed upon (corresponding, for example, to CORE, LAN 2.1, etc.) whereupon a session key 106 is determined for the client 100.

The client-user 100 will typically transmit information such as the user's id, name, and password 112 to the server 102 and, more particularly, to a redirector 116, FIG. 7 which serves as the network interface to and from the LAN server 102. The redirector 116 essentially serves the purpose of a network interface, redirecting disk drives and file input/output, etc. For example, if a client connects to a drive, to the client it may appear to be a local drive. However, the redirector essentially serves as a file system which may pass the drive specification to the actual file system which will manage the drive, thereby redirecting requests from the client to the actual file server handling the drive, such process being transparent to the client.

In conventional operation, the server 102 then would typically examine its database 118, FIG. 3, and based upon the user id, would extract the user's password and session key 106, FIG. 2, and determine if there was a match. If so, the server 102 would then fetch the user definition 120, FIG. 3 out of the server's local database 118. It will be noted that this session key 106 is essentially a timestamp or serial number. In the implementation under consideration, for reasons which will become apparent in discussion of the invention, rather than employing the database 118, the implementation employs the Distributed Computing Environment (DCE) and associated Kerberos registry 122, FIG. 4, and more particularly, the directory and security server (DSS) component of DCE wherein the user definition resides.

Thus in summary, at logon, a client 100, when logging onto a distributed computing environment negotiates a protocol 104, FIG. 2, which results in a protocol level 208 being returned. It is desirable in some local area network server environments such as the LAN Server Enterprise (LSE) product of the IBM Corporation to employ DCE to authenticate use with DCE and thus to associate DCE credentials for users that connect to the LAN because it is deemed to be a relatively more secure environment than that effected by a typical LAN server authentication mechanism. Thus it is desirable at logon to obtain DCE credentials which the server 102 may understand, such DCE credentials being normally obtained through remote procedure calls (RPC).

It has been found, however, that a problem may arise in such local area networks wherein no mechanism is provided to obtain such DCE credentials from the client 100 to the server 102. More particularly, in the case of the LSE and similar LAN products, for example, RPC calls are not utilized natively but nevertheless the server needs to obtain genuine credentials to authenticate the user during the session setup. Such credentials are utilized in determining access to LSE resources which are protected by POSIX access controls lists (ACLs). Thus, a serious problem was presented of providing a mechanism to obtain such DCE credentials from the client to the server with current protocols such as those typically defined by the X/Open Association as represented by the Server Management Block (SMB) protocols, for example, while nevertheless utilizing conventional LAN server mechanisms.

SUMMARY OF THE INVENTION

In a preferred embodiment of the invention, LAN server machines in a computerized LAN network are configured so as to permit them to utilize their existing mechanisms to pass generic security subsystem (GSS) distributed computing environment (DCE) credentials. The server management block (SMB) protocol defined by X/Open is extended to facilitate exchange of such credentials wherein the server utilizes the GSS API interface provided by DCE to obtain and validate such credentials. The GSS interface provides tokens which encapsulate all necessary information to perform mutual authentication between the client and server.

In the preferred embodiment, with respect to such SMB protocol extensions, a new protocol level is defined which, in the specific embodiment includes a new protocol name exchanged in the negotiate protocol (NP) SMB. Pre-existing LAN servers such as the IBM Lan Server Enterprise (LSE) product will turn on a bit (bit 2 with respect to LSE) of the SMB_secmode field in the response, such bit indicating that the server supports exchange of secpkgX SMBs. The server will then wait for an SMBsecpkgX or SMBsesssetupX request. The former response will permit the user/client and server to exchange GSS tokens and mutually authenticate and will further allow the server to select from multiple packages. The pre-existing LAN server product will define a new package under an SMB_pkgname which the LAN server will send and recognize in order to handle a GSSDCE token. A user on a client will be authenticated once the SMBsecpkgX has flowed because the authentication will allocate and return the necessary data structures in order for the server to track the user.

Further in accordance with the invention, as to processing GSS tokens, on the client side, a gss_initiate_sec_context function is called in order for the client to obtain a token to send to the server. The token is sent to the server and a return token then received from the server. The return token is then passed to a gss_initiate_sec_context function, which will now return whether or not the server is authenticated. If the server is not authenticated, session establishment is terminated.

On the server side, when the SMBsecpkgX response is received, the token is extracted and processed by a gss_accept_sec_context function. If the client is authenticated, a token to send to the client is also received. The token is sent to the client on the SMBsecpkgX response. After sending the SMB, the server extracts the user's credentials from the GSS token. The credentials are attached to the session data structures and are utilized thereafter whenever the user attempts to access resources.

Regarding the redirector-GSS interface, in a preferred embodiment herein disclosed, the LAN server redirector normally runs at ring 0 whereas the GSS runs at ring 3, meaning that the redirector and GSS may not communicate directly. Accordingly, in accordance with the invention, a credential manager process is created as an intermediary.

The credential manager gives a captive thread to the redirector at startup. As connections are made to the LAN servers, the redirector utilizes the captive threads to request and process GSS tokens. The credential manager uses the credentials of the user currently logged onto the LAN server to obtain the tokens. A user profile management (UPM) process notifies the credential manager of logon and logoff events. This allows the credential manager to track the logged-on user without querying the UPM on every session setup attempt.

DETAILED DESCRIPTION OF THE PREFERRED EMBODIMENT

Figure 1:
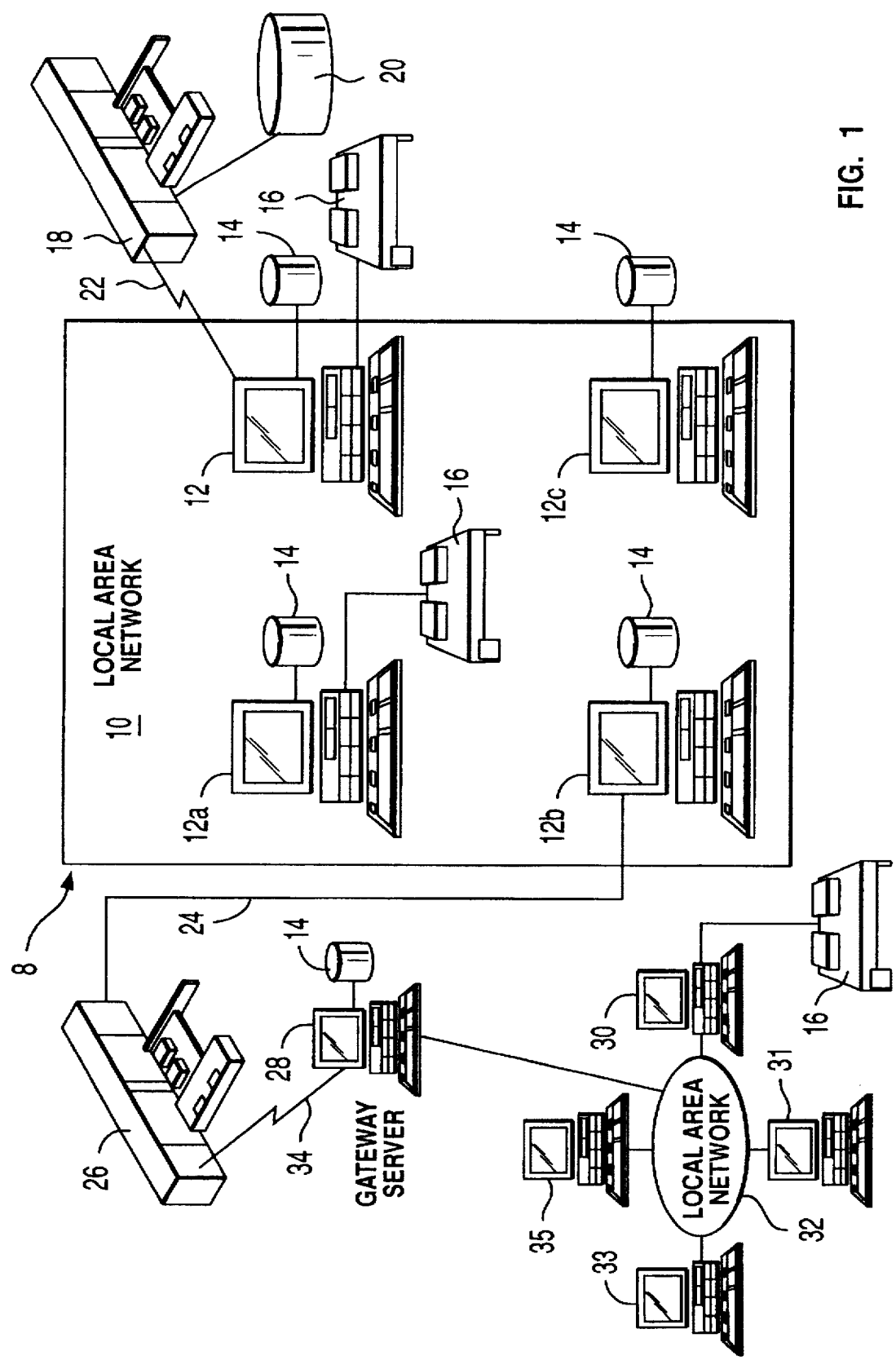
FIG. 1 is a functional block diagram of a computer network in which the invention may be advantageously employed.

Turning first to FIG. 1, a high level description of a network environment will first be provided in which the invention preferably may be embodied. With reference to FIG. 1, there is depicted a pictorial representation of a data processing system 8 which may be utilized to implement a method and system of the present invention. As may be seen, data processing system 8 may include a plurality of networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer workstation, both product of International Business Machines corporation, located in Armonk, N.Y. "RISC SYSTEM/ 6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of conmmunications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture /370", "ESA/370", "Enterprise Systems Architecture/370", and "ESA/390" are trademarks of IBM; "Application System /400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/ communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

A preferred embodiment of the present invention may be incorporated within various computers depicted within data processing system 8.

Figure 2:
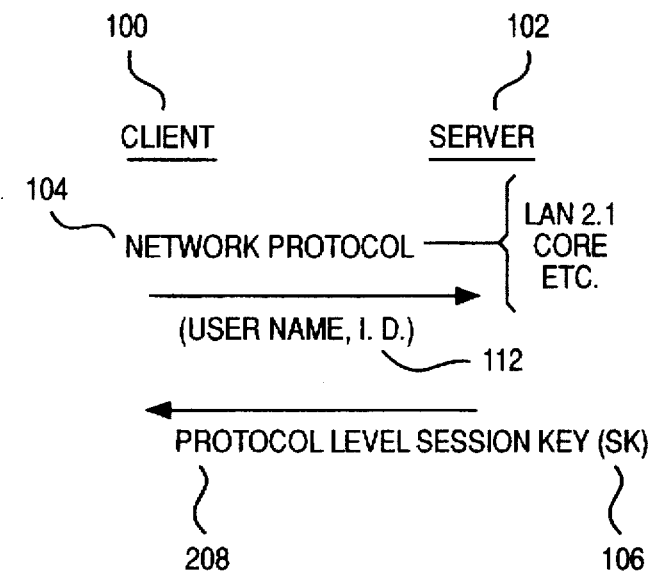
FIG. 2 is a schematic illustration of protocol negotiation.
Figure 4:
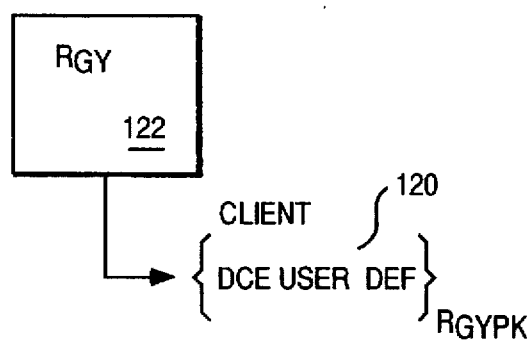
FIG. 4 is a block diagram illustrating usage of DCE registry by a server in order to obtain user definitions.
Figure 7:
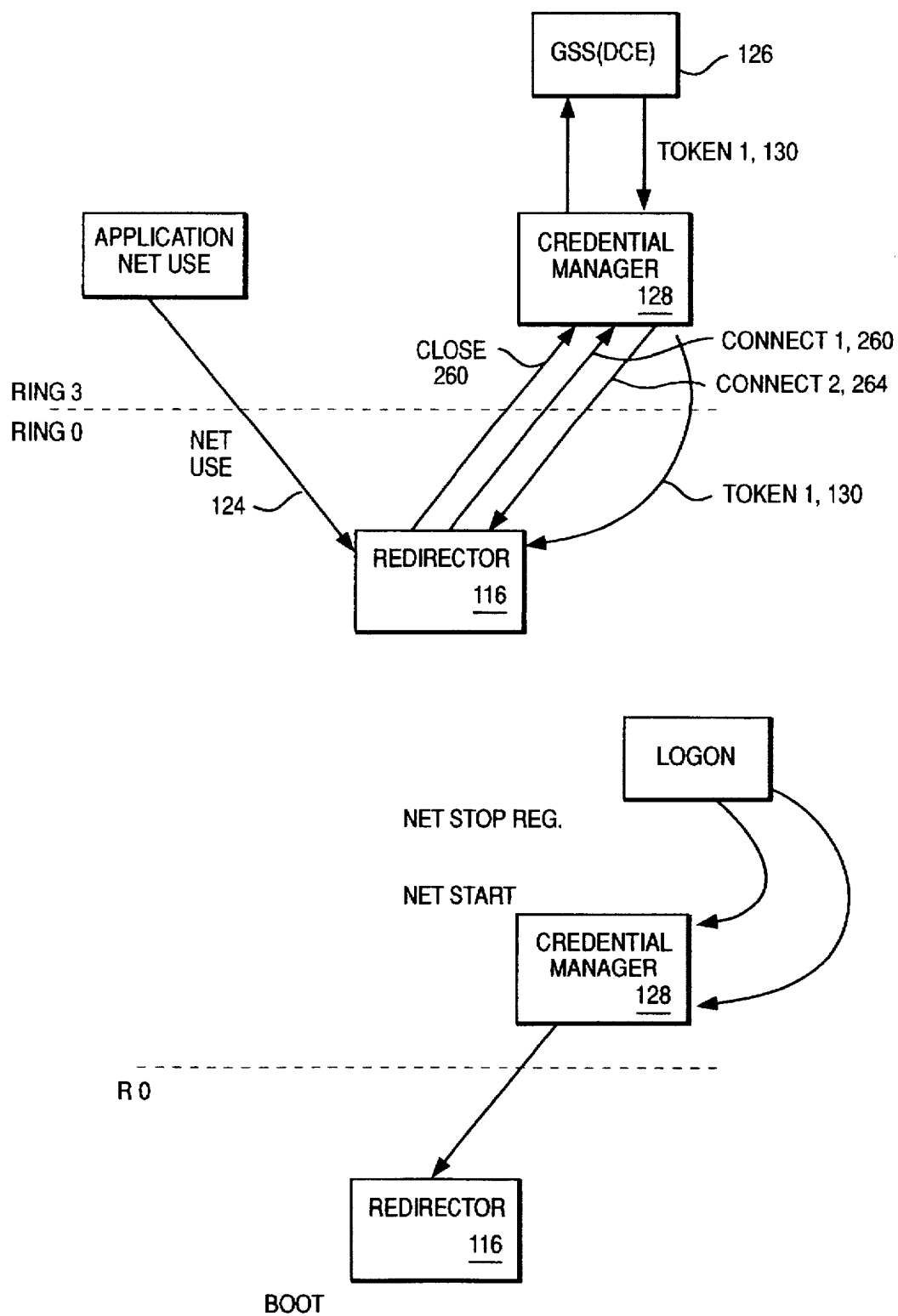
FIG. 7 is a block diagram illustrating the credential manager and redirector of the invention.
Figure 8:
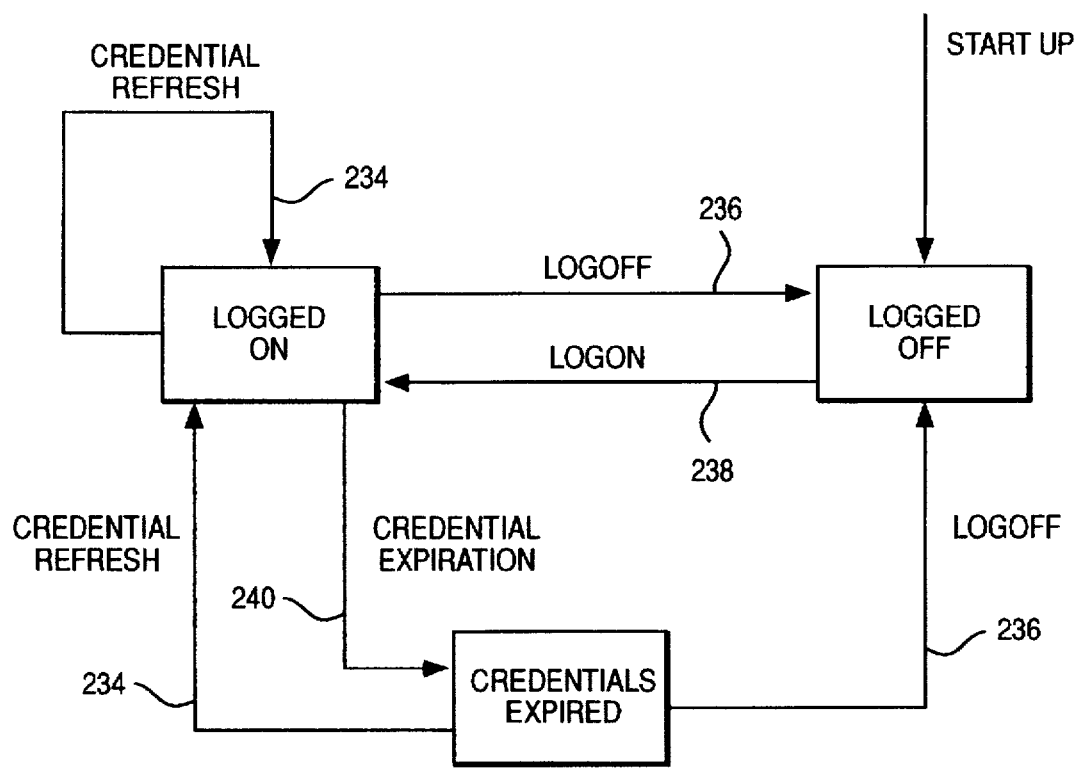
FIG. 8 is a state machine employed in accordance with the invention.

In the DSS protocol, which is part of DCE, the client 100, FIG. 2, will request a ticket from the registry 122, FIG. 4, which may then be passed to the server 102. With respect to some applications, they will issue a NetUse such as that shown at 124, FIG. 7 to the redirector 116 which will kick off the protocol—essentially a user-issued command triggering the client 100 to set up a session with the server 102. In response to this NetUse, the redirector 116, then issues server management blocks (SMBs) according to the SMB communication protocol of X/Open in order to effect the negotiation of protocol and session setup. In accordance with the invention, however, in LAN servers utilizing a generic security subsystem (GSS) component of DCE, 126, FIG. 7, and a redirector such as that shown at 116, FIG. 7, as previously noted, a problem is presented of providing a mechanism for conveying requests through a credential manager 128, FIG. 8 to the CSS 126. In order to effect this mechanism, a state machine, FIG. 8, is defined for the credential manager 128 because there are commands interchanged between the credential manager and redirector required for setting up a session. The operation of this state machine will be hereinafter discussed with reference to FIG. 8 in more detail.

Figure 6:
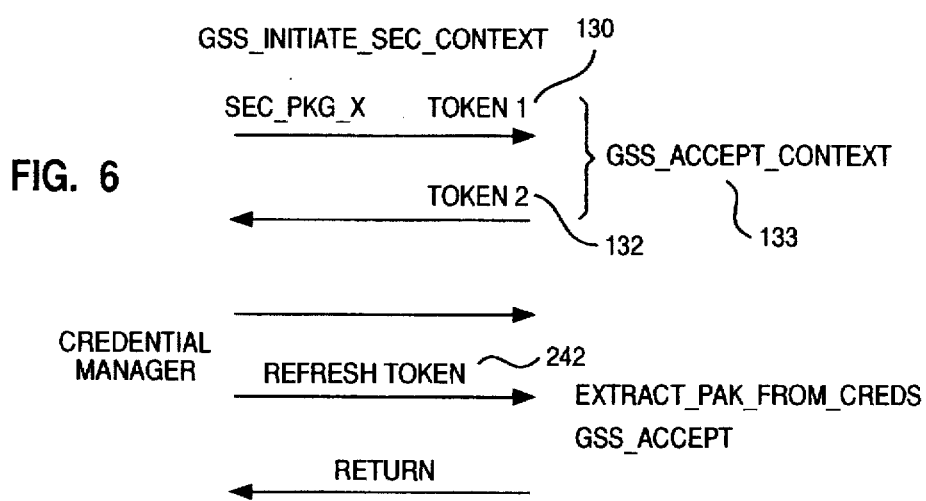
FIG. 6 is a schematic illustration of the token mechanism of the invention.

It will be recalled that the SMB defined by the X/Open protocol is essentially a free-form security extension which provides the concept of packages which are a mechanism employed to authenticate users. It is a significant feature of the invention that a unique such package is defined in the implementation of the invention which will provide for passing of tokens such as 130, FIG. 7. Referring further to FIG. 7, this token 130 will be seen to be passed from the GSS 126 to the credential manager 128 and then to the redirector 116 (also shown in FIG. 6). It will be recalled that the redirector 116 essentially is the component of the client. The server will make a call gss_accept_context, 133, FIG. 6, in order to process this token 130 after it has been received in the GSS package. Receipt by the redirector of the token in turn will cause the server 102 to obtain a second token, 132, FIG. 6. The client 100 will then transfer this second token 132 to the credential manager 128 and then to the GSS 126, whereupon the GSS may then authenticate the server 102.

Figure 3:
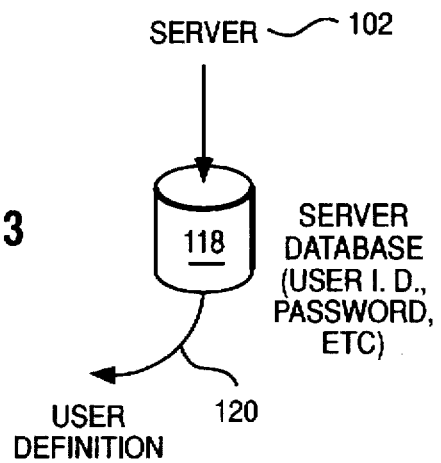
FIG. 3 illustrates usage of a database by a server to obtain user definitions.

In summary, when the first token goes across the network, the client essentially has authenticated itself to the server. If it is not authenticated, the session setup terminates whereas if it is authenticated, the session setup is effected. Because the server has already authenticated the client, the server now will issue a function call to GSS 126, and obtain a definition from GSS of the user as previously noted. In prior systems, it is important to note that, as previously described, servers maintained their own database such as that shown in FIG. 3, reference numeral 118, to obtain a user definition 120 for verifying the user. However in accordance with the invention, the GSS is not replicated for every server, and also differing security mechanisms may be provided under GSS. The DCE extensions permit the system to obtain credentials and not only is the user authenticated but according to the system, it is thereby known which server authenticated the user. GSS is employed but it is actually the Kerberos functions in DCE which are employed underneath for the authentication.

In summary, a system is herein disclosed permitting conventional LAN server workstations and servers integrated with DCE to employ their existing mechanisms in order to pass GSS DCE credentials for authentication. Although the invention is not intended to be so limited, in the specific embodiment disclosed herein, changes are made to workstations and servers operating the OS/2 (TM) operating system available from the IBM Corporation. Further details, as background, regarding a representative LAN system may be obtained from "OS/2 Lan Server, Programming Guide and Reference", copyright IBM Corporation, S10 H-9687-00, 1994, which is incorporated herein by reference. However, the aforementioned concept may be extended to stations and servers executing other operating systems as well.

In the OS/2 embodiment, the modifications to existing Lan server products will now cause the second bit of the smb_secmode field in the NP response to be turned on. The server will then wait for the previously described SMBsecpkgX or SMBsesssetupX request. The former, of course, will permit the user and server to exchange GSS tokens and mutually authenticate, and is defined in "PROTOCOLS FOR X/OPEN PC INTERWORKING: SMB VERSION 2", Section 11.2, available from the X/Open Corporation. This function permits a server to select from multiple packages.

The SMBsesssetupX following an SMBsecpkgX request may have a zero length smb_apasswd because authentication has already occurred, and any contents therein will thus be ignored. If no SMBsecpkgX request is received, or no known package was included in the SMBsecpkgX request and received, the smb_apasswd field must contain a valid password to allow the server to authenticate the user. In this case, the server must obtain the credentials for the user.

In accordance with the implementation of the invention herein described, changes must be provided to the Negotiate Protocol (NP) as follows. A Set Flag will be made to enable the secpkgX (bit number 2 in the secmode field as previously described). Still further, a new srvhueristic bit will be provided which will determine whether or not the server will support legacy clients. If legacy support is turned off, then the server will not offer the set of legacy protocols when negotiating. This will prevent the less-secure legacy clients from connection.

Also as previously noted, a new protocol level is defined which, in the specific implementation under consideration, provides that a string LSE 10 flow on the wire. In order to obtain tickets for cross-cell servers, the NP response will change to include the server's cell name and its length. The cell name will be after the domain name and will be used by the Credential Manager 128, FIG. 5, when obtaining the security context. The cell name is required for cross-cell authentication but will only be sent when negotiation results in the LSE 10 string.

Also as previously noted, secpkgX changes will be required. As noted, this function is defined in "PROTOCOLS FOR X/OPEN PC INTERWORKING: SMB VERSION 2", Section 11.2 available from X/Open. This format will be employed in the present embodiment herein disclosed, with the specific information being defined for the particular LAN server which is employed, such as the LS 4.0E available from the IBM Corporation. For the SMB_pkglist structure, the SMB_pkgname will be "Lan Server 4.0E GSS/DCE Token" which, as previously noted, will be the only package that the LS 4.0E server product will send or recognize.

In the following Table, the data structures for the aforementioned SMBsecpkgX will be defined as follows:

TABLE 1

```
Request Format:
    BYTE      smb_com          /* value = 7E    (????)                    */
    BYTE      smb_wct;         /* value = 4                               */
    BYTE      smb_com2;        /* secondary (X) command, 0xFF = none      */
    BYTE      smb_reh2;        /* reserved (must be zero)                 */
    WORD      smb_off2;        /* offset (from SMB hdr start) to next     */
                               /* cmd (@smb_wct)2                         */
    WORD      smb_pkgtype;     /* package type = 0                        */
    WORD      smb_numpkge;     /* Number of Packages in list              */
    WORD      smb_bcc;         /*                                         */
    struct    smb_pkglist[*];  /* package list structure, 1 package       */
                               /* list for LS 4.0E                        */
Package List Structure         (smb_pkglist) Format:
```

TABLE 1-continued

| | | | |
|---|---|---|---|
| WORD | smb_pkgnamlen; | /* length of package name | */ |
| WORD | smb_pkgarglen; | /* length of the package-specific info | */ |
| BYTE | smb_pkgname[*]; | /* name of the package | */ |
| struct | smb_pkgargs[1]; | /* package-specific info for LS 4.0E | */ |
| Package Specific Information | | (smb_pkgargs) Format: | |
| DWORD | smb_xp_flags; | /* Bit - If set, a reply with a GSS | */ |
| | | /* token is required for mutual | */ |
| | | /* authentication | */ |
| WORD | smb_xp_TokenLen; | /* Length of GSS token | */ |
| BYTE | smb_xp_Token[*]; | /* The GSS Token containing | */ |
| | | /* Authentication info | */ |
| BYTE | smb_xp_name[*]; | /* Name of user to be authenticated | */ |
| Response Format: | | | |
| BYTE | smb_com | /* value = 7E | */ |
| BYTE | smb_wct; | /* value = 4 | */ |
| BYTE | smb_com2; | /* secondary (X) command, 0XFF = none | */ |
| BYTE | smb_reh2; | /* reserved (must be zero) | */ |
| WORD | smb_off2; | /* offset (from SMB hdr start) to next | */ |
| | | /* cmd (@smb_wct) | */ |
| WORD | smb_index; | /* number of the package selected by | */ |
| | | /* server. 0 for LS 4.0E | */ |
| WORD | smb_pkgarglen; | /* length of package specific info | */ |
| WORD | smb_bcc; | | |
| struct | smb_pkgargs[1]; | /* package-specific information | */ |
| Package Specific Information | | (smb_pkgargs) Format: | |
| DWORD | smb_xp_flags; | /* Bit 0, GSS tokens require another | */ |
| | | /* round of exhanges. | */ |
| BYTE | smb_xp_Token[*]; | /* the GSS Token containing | */ |
| | | /* authentication info | */ |

Figure 5:
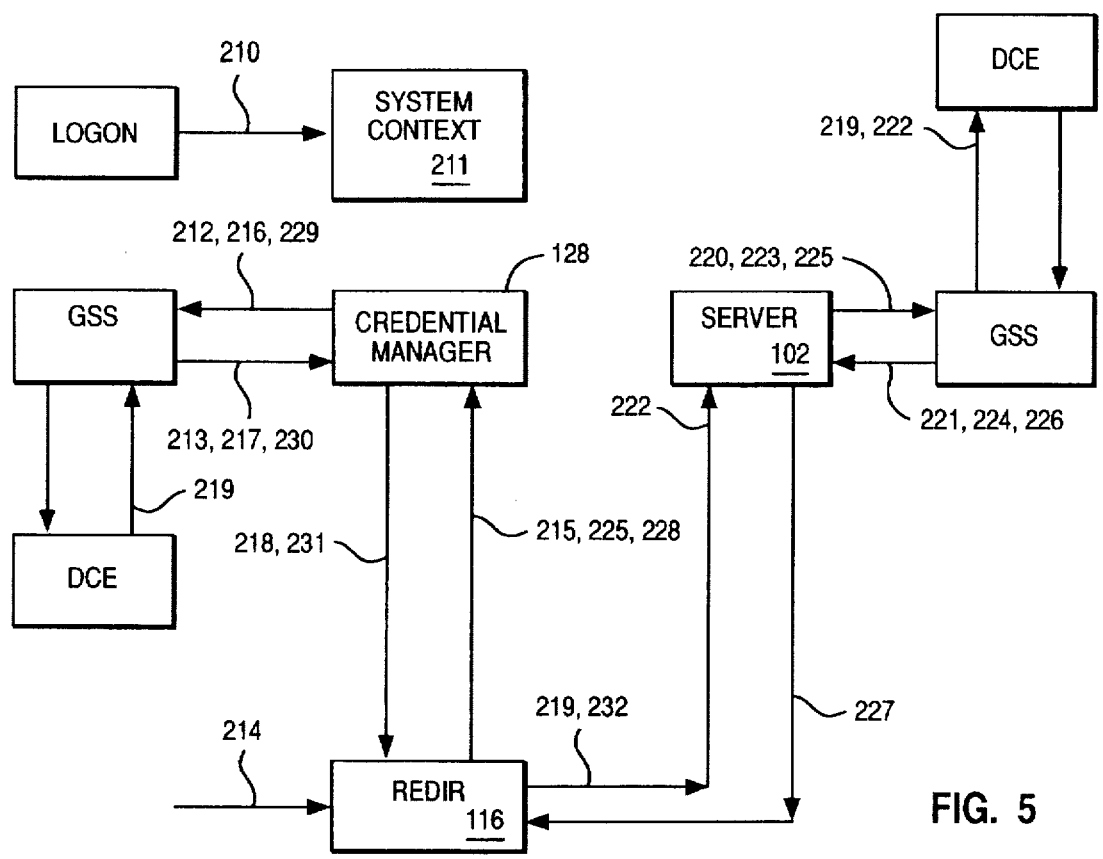
FIG. 5 is a block diagram depicting the components and signal flow of the invention implementable in the system of FIG. 1.

Referring now to FIG. 5 in greater detail, the basic flow of this system is depicted therein schematically. First, the user logs on, 210, with the login context being set as system context, 211. Next, LSCredMGR function obtains credentials for a user, and the GSS credentials are created from the system context, 212, 213. This is followed by a session setup request to the server, 214. The next series of steps 215–218 represent that a context token for the Server is obtained which includes the GSS call(s) to DCE.

Continuing with FIG. 5, at step 219, the SMBsecpkg_X call is sent which contains the system context token. At this point servers obtains credentials at startup time, 220, 221 and the SMBsecpkg_X is received, 222. Next, at 223, 224, the Server will validate the user with the GSS_Accept_context function and receives a response token which includes GSS call(s) to DCE. This is followed by the server extracting EPAC from the GSS token, 225, 226. Next, the SMBsecpkg_X response is sent containing the GSS context token, 227. Also, the SMBsecpkg_X response is received, 227. As shown by steps 228–231, the Server's context token is then validated which includes GSS call(s) to DCE. Finally, as shown at reference numeral 232, the SMBSessSetup_X is sent and received.

Another aspect of the invention relates to the conventional practice of providing tokens which have a finite lifetime. When the token expires, typically the server will automatically then break connection to the client. Accordingly, some means is needed to periodically refresh the token.

Thus, in accordance with the invention, after a session is set up, the credential manager 128, FIG. 5, will determine what the remaining lifetime of a ticket is. Just before expiration, after making such determination, the credential manager 128 will thus preferably obtain a new token and transfer it to the server 102. This token may be seen represented as token 242 in FIG. 6, and will be described further with reference to the event monitoring function provided by the state machine of FIG. 8.

The current logon status affects how the credential manager 128 manages the contexts. There are essentially four logon events which will affect the credential manager as follows.

The first, as shown in FIG. 8, is the logon function 238. The credential manager 128 must obtain the DCE system credentials. The credentials will be imported from the logon exec. Next, the logoff event 236, FIG. 8, in like manner will affect the credential manager 128. The credential manager must clear all of the session information it was maintaining for the logon user. When a logoff occurs, the RDR will close all sessions and release the DCE system credentials it is using. This event will still be needed for cleanup and state maintenance. Thirdly, a credential refresh 234 is provided for in the manner described above. This event will prevent the credential manager from transitioning into a state of expired credentials. The credential cache name will not change. If the system is already in an expired state, a new context and cache name will be acquired. The credential manager will handle both types of refreshes. Fourthly, credential expiration is provided for in the state machine, shown at reference numeral 240, FIG. 8. When the credentials expire, the credential manager 128 can no longer obtain tickets. The credential manager 128 will accordingly return an error code to the RDR when requests come in during this state. Once the user is in this state, the credentials cannot be refreshed, and a new set of credentials will be obtained by the logon exec.

Another aspect of the credential manager 128 should be noted when the client 100 is being shut down. In such event, the redirector 116 will detect this (e.g., a Net Stop function), whereupon a close command (260, FIG. 7) issued by the redirector 116 will cause the credential manager process 128 to terminate. When the systems are restarted, the redirector 116 will obviously be started upon booting. However, the credential manager 128 is not yet running until the rest of the GSS is started. Once the GSS starts, the credential manager 128 will send the token command 130 which will be held captive in the redirector 116. This thread of execution is then utilized by the redirector, which issues a connect 1 command 262. A connect 2 command, 264, holds the thread captive in the credential manager 128.

With the foregoing description in mind, additional factors in the implementation of the invention as described herein are noteworthy. It will noted that in DCE terms, "credentials" may be thought of as Kerberos tickets or, more generically, a definition of a user and the group, the user is a member of (e.g., administrator, guest, user, etc.). Such credentials are on a per process basis typically, wherein each process is in charge of managing its own process so to speak. In accordance with the invention, however, a credential manager has thus herein been provided for the whole networking system which will manager the individual processes. Thus, in accordance with the invention, all such individual processes will have no idea that DCE credentials are operating beneath them inasmuch as the system assumes responsibility for items hereinbefore normally thought to be process-specific, such as the particular login being employed. Normally it is unique per application. However, in accordance with the invention, when applications make various calls which would otherwise have been process specific, they are now being managed at a system level basis wherein the credential manager knows what each of the processes are and sends proper credentials in order to obtain tokens.

In accordance with the invention, two software entities have essentially been merged which otherwise implement relatively dissimilar mechanisms for managing security. More specifically, the invention provided for LAN server machines to utilize their existing mechanisms in conjunction with DCE code, whereby these two entities of conventional LAN and DCE code are brought together so as to work seamlessly. It will be recalled that LAN implementations of security provide for relatively simple authentication, and one of the benefits to employing DCE authentication in accordance with the invention is because it provides a more secure environment with a more complex authentication mechanism.

In addition to the novel provision of a credential manager implementation for enabling LAN servers to operate with GSS DCE credentials, the implementation in the invention of tokens employing the SMBsecpkgX package, which is part of the X/Open specification and SMB architecture, has provided novel results. In accordance with this aspect of the invention, the novel package thereby defined includes a flag signifying mutual authentication, the hereinbefore described token, and user name which is normally obtained in a later SMB on session setup when the user is defined. Now, rather than the SMBsecpkg_X being a negotiation of the authentication protocol to use at session setups, in accordance with the invention authentication has been moved upward from session setup to the SMBsecpkgX function.

By its architectural definition, session setups are where users are authenticated. However, in accordance with the invention, authentication as noted is moved up to prior to the SMB. Thus when the system gets to a session setup, the work to effect a session setup is performed, but authentication is not required because it has already been effected. Through the novel use of a custom SMBsecpkg_X package, authentication has effectively been moved from one SMB to another. Conventional usage of this package function, however, was that when a product is sent encrypted with a session key, the feature would allow specification of different mechanisms for authentication as desired (e.g., different encryption algorithms, keys, etc.). However, the implementation of the invention, as aforesaid, facilitates moving authentication up from the session setups to the transmission of the SMBsecpkg_X package.

While the invention has been shown and described with reference to particular embodiments thereof, it will be understood by those skilled in the art that the foregoing and other changes in form and detail may be made therein without departing from the spirit and scope of the invention.

We claim:

1. A method for improving mutual authentication during session setup with a distributed computing environment (DCE) credentials between clients and servers interconnected in a LAN server environment which does not support remote procedure calls (RPC) natively, comprising the steps of:

predefining an extension of a server management block (SMB) protocol to exchange credentials;

accessing with said server as a function of said predefined extension a generic security subsystem (GSS) through a GSS API interface defined by said DCE, said accessing step further including retrieving tokens with said clients and said server encapsulating information necessary to perform said mutual authentication, and activating a second bit in an SMB_secmode field in a negotiate protocol (NP) response;

detecting with said server an SMBsecpkgX response;

exchanging, in response to said detecting, GSS tokens between said client and said server to effect said mutual authentication;

defining a GSS/DCE token package corresponding to said SMBsecpkqX response;

calling with said client a GSS_initiate_sec_context function to obtain a first token to send to said server;

transferring a second token in response to said first token from said client to said GSS_initiate_sec_context function; and returning with said GSS_initiate_sec_context function whether or not said server is authenticated; and obtaining and validating said credentials from said GSS in response to said accessing.

2. The method of claim 1 further including:

extracting said second token with said server in response to said detecting said SMBsecpkgX response;

processing said extracted token with a GSS_accept_sec_context function;

receiving with said server a GSS token to send to said client in response to a client authentication;

transferring said GSS token to said client on said SMBsecpkgX response;

extracting with said server said credentials of said user from said GSS token; and attaching said extracted credentials to session data structures for use when said client seeks access to resources of said network.

3. The method of claim 2 wherein said server includes a redirector, and said redirector and said GSS operate at different rings, and wherein said method further includes:

establishing a credential manager process as an intermediary between said redirector and said GSS.

4. Apparatus for improving mutual authentication during session setup with a distributed computing environment (DCE) credentials between clients and servers interconnected in a LAN server environment which does not support remote procedure calls (RPC) natively, comprising:

means for predefining an extension of a server management block (SMB) protocol to exchange credentials;

means for accessing with said server as a function of said predefined extension a generic security subsystem (GSS) through a GSS API interface defined by said DCE, said means for accessing further including means for retrieving tokens with said clients and said servers encapsulating information necessary to perform said mutual authentication;

means for activating a second bit in an SMB secmode field in a negotiate protocol (NP) response;

means for detecting with said server an SMBsecpkgX response;

means for exchanging, in response to said detecting, GSS tokens between said client and said server to effect said mutual authentication;

means for defining a GSS/DCE token package corresponding to said SMBsecpkqX response;

means for calling with said client a GSS_initiate_sec_context function to obtain a first token to send to said server;

means for transferring a second token in response to said first token from said client to said GSS_initiate_sec_context function; and means for returning with said GSS_initiate_sec_context function whether or not said server is authenticated; and means for obtaining and validating said credentials from said GSS in response to said accessing.

5. The apparatus of claim 4 further including:

means for extracting said second token with said server in response to said detecting said SMBsecpkgX response;

means for processing said extracted token with a GSS_accept_sec_context function;

means for receiving with said server a GSS token to send to said client in response to a client authentication;

means for transferring said GSS token to said client on said SMBsecpkgX response;

means for extracting with said server said credentials of said user from said GSS token; and means for attaching said extracted credentials to session data structures for use when said client seeks access to resources of said network.

6. The apparatus of claim 5 wherein said server includes a redirector, and said redirector and said GSS operate at different rings, and wherein said apparatus further includes:

means for establishing a credential manager process as an intermediary between said redirector and said GSS.

7. A computer program product for improving mutual authentication during session setup with a distributed computer environment (DCE) credentials between clients and servers interconnected in a LAN server environment which does not support remote procedure (RPC) natively, said computer program product comprising: a computer usable medium having computer readable program code embodied in said medium for improving mutual authentication during session setup with the DCE, said computer program product including:

computer readable program code means for predefining an extension of a server management block (SMB) protocol to exchange credentials further including computer readable program code means for activating a second bit in an SMB_secmode field in a negotiate protocol (NP) response;

computer readable program code means for accessing with said server as a function of said predefined extension a generic security subsystem (GSS) through a GSS API interface defined by said DCE, said computer readable program product means for accessing further including computer readable program code means for retrieving tokens with said clients and said servers encapsulating information necessary to perform said mutual authentication; and computer readable program code means for detecting with said server an SMBsecpkqX response;

computer readable program code means for exchanging, in response to said detecting, GSS tokens between said client and said server to effect said mutual authentication;

computer readable program code means for defining a GSS/DCE token package corresponding to said SMBsecpkgX response;

computer readable program code means for calling with said client a GSS_initiate_sec_context function to obtain a first token to send to said server;

computer readable program code means for transferring a second token in response to said first token from said client to said GSS_initiate_sec_context function; and computer readable program code means for returning with said GSS_initiate_sec_context function whether or not said server is authenticated; and computer readable program code means for obtaining and validating said credentials from said GSS in response to said accessing.

8. The computer program product of claim 7 further including:

computer readable program code means for extracting said second token with said server in response to said detecting said SMBsecpkgX response;

computer readable program code means for processing said extracted token with a GSS_accept_sec_context function;

computer readable program code means for receiving with said server a GSS token to send said client in response to a client authentication;

computer readable program code means for transferring said GSS token to said client on said SMBsecpkgX response;

computer readable program code means for extracting with said server said credentials of said user from said GSS token; and computer readable program code means for attaching said extracted credentials to session data structures for use when said client seeks access to resources of said network.

9. The computer program product of claim 8 wherein said server includes a redirector, and said redirector and said GSS operate at different rings, and wherein said computer program product further includes:

computer readable program code means for establishing a credential manager process as an intermediary between said redirector and said GSS.

* * * * *